United States Patent [19]

He

[11] Patent Number: 5,190,570
[45] Date of Patent: Mar. 2, 1993

[54] COMBINED DECORATIVE FLOWER POT AND AIR FILTER

[76] Inventor: Chin C. He, P.O. Box 82-144, Taipei, Taiwan

[21] Appl. No.: 885,025

[22] Filed: May 18, 1992

[51] Int. Cl.⁵ .............................................. B01D 46/10
[52] U.S. Cl. ........................................ 55/279; 55/315; 55/385.2; 55/472; 422/123; 422/124
[58] Field of Search ............... 55/279, 316, 315, 471, 55/472, 385.2; 422/123, 124, 306

[56] References Cited

U.S. PATENT DOCUMENTS 4,732,591  3/1988  Tujisawa et al. ..................... 55/279

Primary Examiner—Charles Hart
Attorney, Agent, or Firm—Alfred Lei

[57] ABSTRACT

This invention relates to a combined decorative flower pot and air filter and in particular to one including a flexible trunk having a plurality of branches with perforations for receiving twigs, a base, a motor arranged in the base and having an outlet and an inlet, an air filter mounted on the outlet of the motor, a net mounted on a bottom of the flexible trunk and disposed on the base, a tubular member arranged within said flexible trunk and extending upwardly out of the flexible trunk and downwardly to connect with the inlet of the motor, a plurality of canes twisted on the branches and extending down into holes near the outlet of the motor, and a fragrant agent fitted on an outer side of the air filter.

1 Claim, 4 Drawing Sheets

COMBINED DECORATIVE FLOWER POT AND AIR FILTER

BACKGROUND OF THE INVENTION

It is found that the conventional air filter can only be used to purify the air and has no any other functions. Further, the appearance of such air filter may destroy the elegance of a place.

Therefore, it is an object of the present invention to provide a combined decorative flower pot and air filter which may obviate and mitigate the above-mentioned drawbacks.

SUMMARY OF THE INVENTION

This invention relates to a combined decorative flower pot and air filter.

It is the primary object of the present invention to provide a combined decorative flower pot and air filter which may be used as a decorative flower pot as well as an air filter.

It is another object of the present invention to provide a combined decorative flower pot and air filter which may supply fragrant fresh air.

It is still another object of the present invention to provide a combined decorative flower pot and air filter which may purify the air.

It is still another object of the present invention to provide a combined decorative flower pot and air filter which is simple in construction.

It is a further object of the present invention to provide a combined decorative flower pot and air filter which is low in cost.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
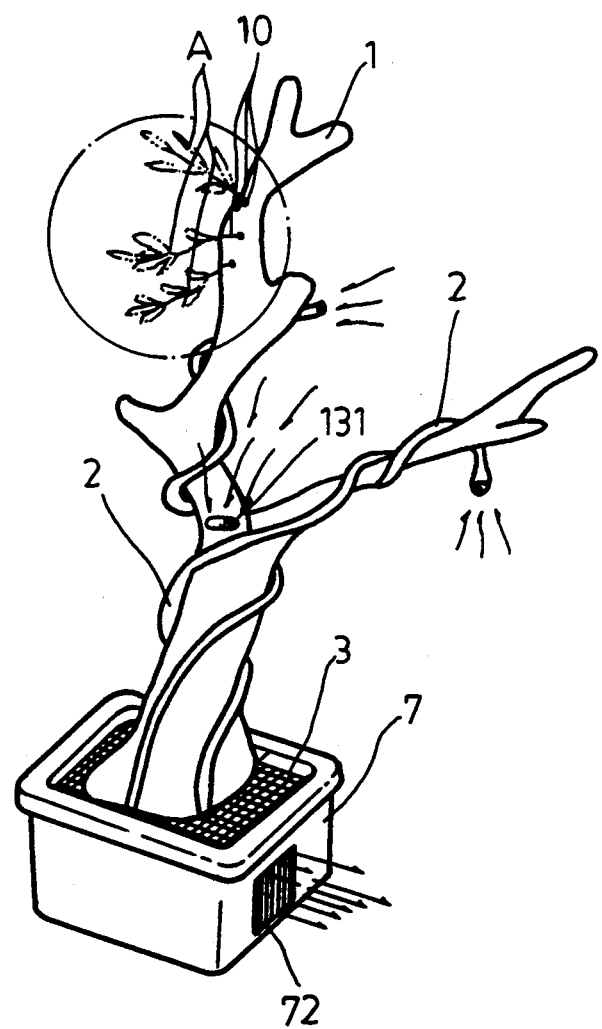
FIG. 1 is a perspective view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figures 2, 2A:
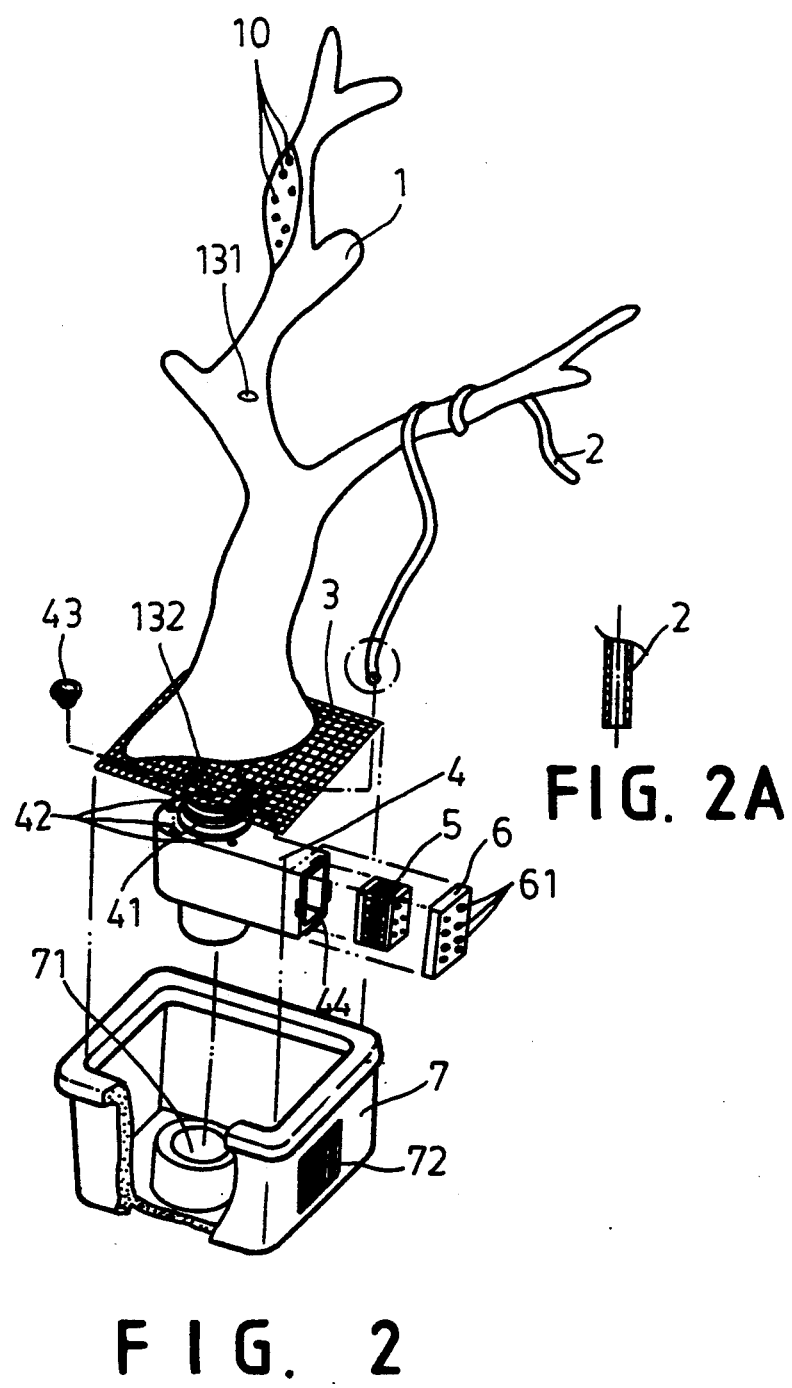
FIG. 2 is an exploded view of the present invention.
FIG. 2A is a sectional view of the twig.

With reference to the drawings and in particular to FIGS. 1 and 2 thereof, the present invention mainly comprises a flexible trunk 1, a plurality of canes 2, a net 3, a motor 4, and a base 7.

Figure 3:
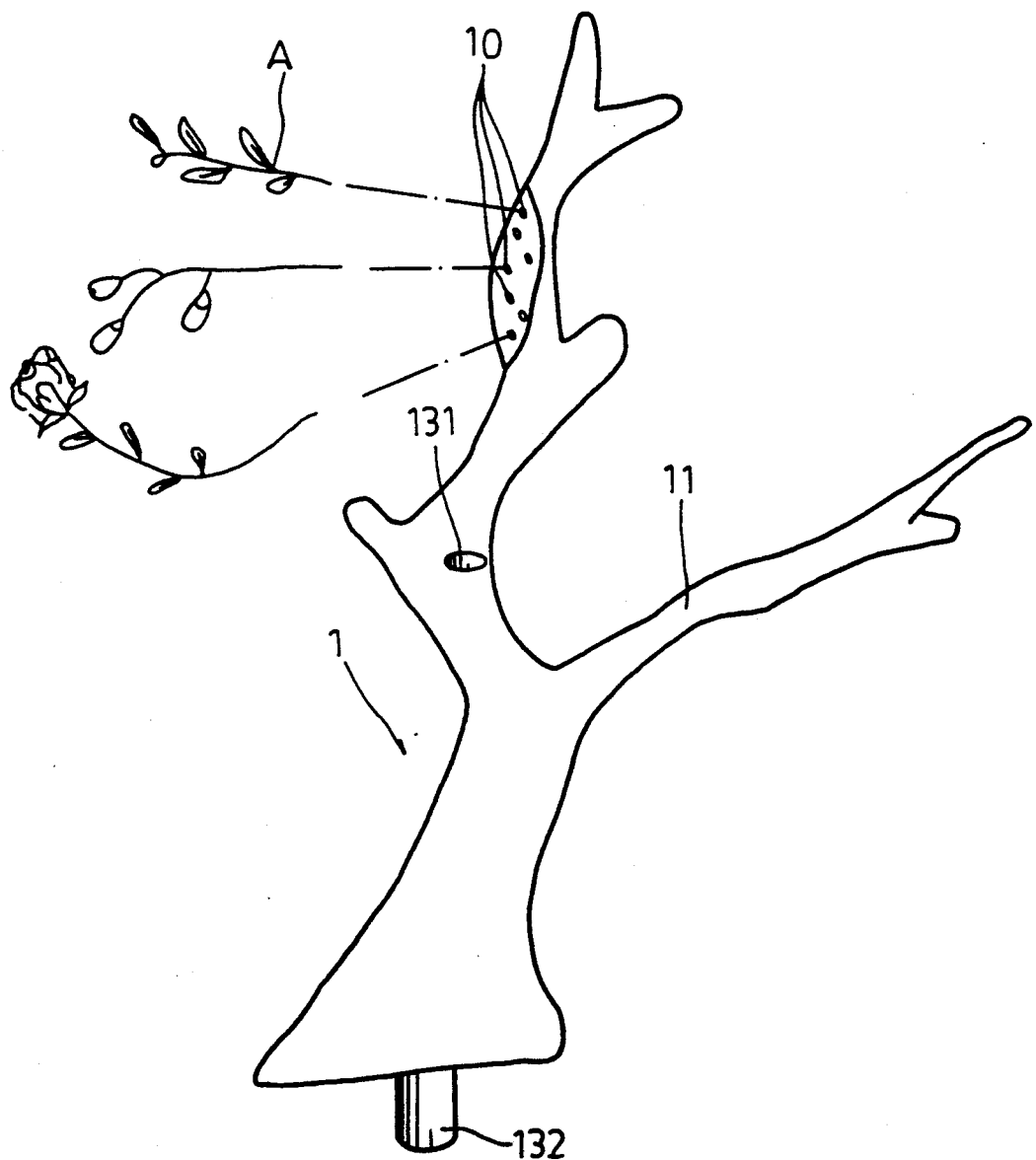
FIG. 3 is an enlarged fragmentary view of the present invention.
Figure 4:
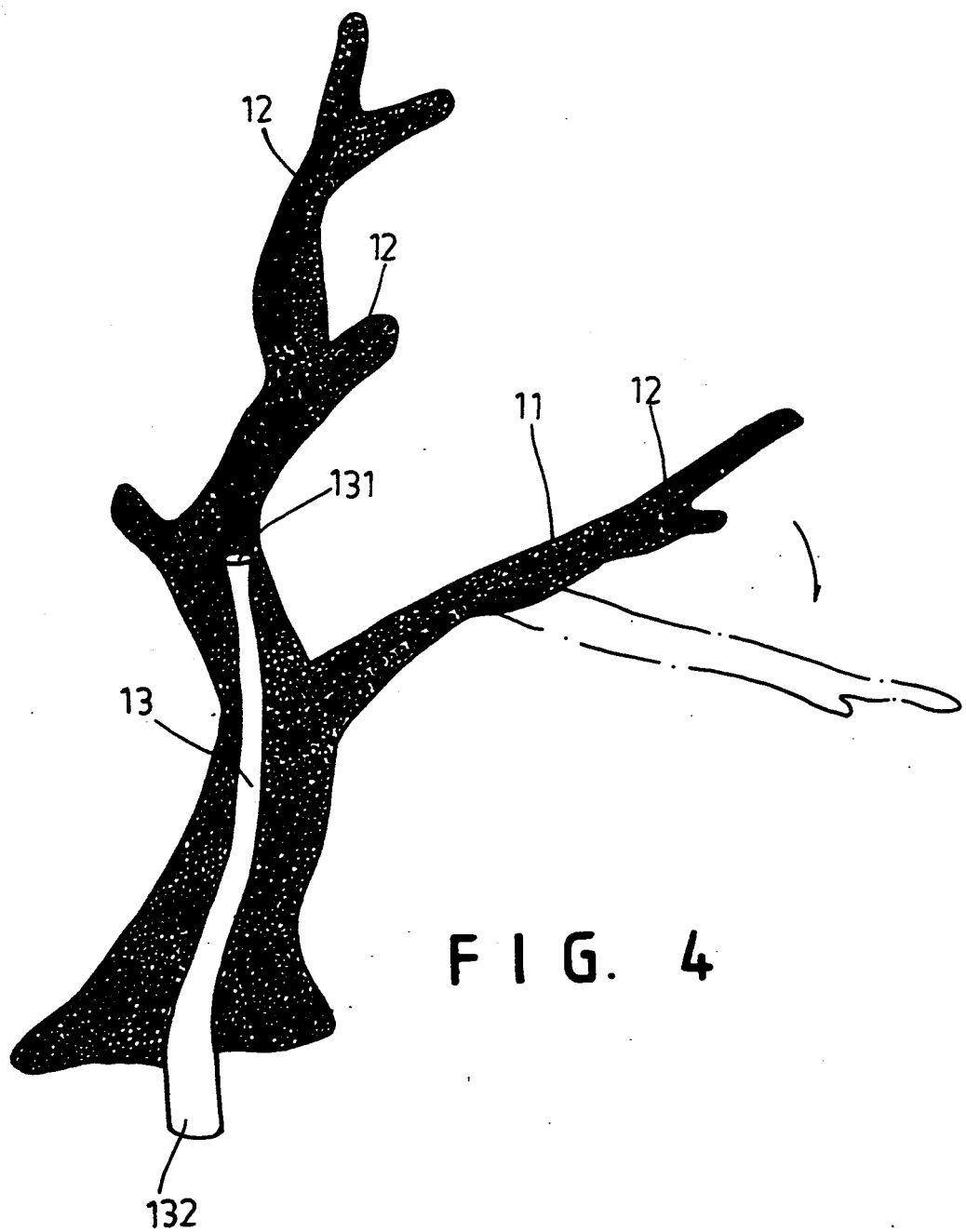
FIG. 4 shows the interior of the flexible trunk.

As illustrated in FIG. 3 and 4, the flexible trunk 1 is integrally made of foamed material and has a plurality of perforations 10 for receiving twigs A. Further, there are a plurality of branches 11 extending from the body of the flexible trunk 1 and provided with a metallic wire therein so that the branches 11 may be twisted and kept in position as desired. A tubular member 13 is arranged within the flexible trunk 1 and extends upwardly out of the flexible trunk 1 so that the upper end 131 of the tubular member 13 is in communication with the outside and air may flow into the tubular member 13. Referring back to FIG. 2, the lower end 132 of the tubular member 13 is inserted into an inlet 41 of the motor 4. The net 3 is mounted on the bottom of the flexible trunk 1 and disposed on the base 7, with the lower end of the tubular member 13 extending downwardly through the net 3. Hence, it is possible to arrange decorative stone or synthetic lawn on the net 3 as desired.

The cane 2 is a flexible tubular member and inserted into the holes 42 near the inlet 41 of the motor 4 through the net 3. The holes 42 not engaged with the canes 2 are sealed with a plug 43. The motor 4 is further provided with an outlet 44 on which there is mounted an air filter 5. A fragrant agent 6 with a plurality of holes 61 is fitted on the outer side of the air filter 5 so that the air will be accompanied with fragrance after filtered.

As may be seen in FIG. 2, the motor 4 is mounted on a seat 71 in the base 7 and the outlet 72 of the base 7 is aligned with the notch 72 of the base 7 so that fresh air may flow therethrough.

Further, it is understood that the present invention may be equipped with a timer for controlling the working period of the air filter.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A combined decorative flower pot and air filter comprising:
   a flexible trunk having a plurality of branches with perforations for receiving twigs, each of said twigs being provided with a metallic wire in the interior so that said twigs may be twisted and kept in place as desired;
   a base;
   a motor arranged in said base and having an outlet and an inlet;
   an air filter mounted on the outlet of said motor;
   a net mounted on a bottom of said flexible trunk and disposed on said base;
   a tubular member arranged within said flexible trunk and extending upwardly out of said flexible trunk and downwardly to connect with the inlet of said motor;
   a plurality of canes twisted on said branches and extending down into holes near the outlet of said motor; and
   a fragrant agent fitted on an outer side of said air filter.

* * * * *